US008218007B2

(12) United States Patent  (10) Patent No.: US 8,218,007 B2
Lee et al.  (45) Date of Patent: Jul. 10, 2012

(54) CAMERA SYSTEM FOR A VEHICLE AND METHOD FOR CONTROLLING A CAMERA SYSTEM

(75) Inventors: Jonathan Lee, Puyallup, WA (US); Marcial Hernandez, Albuquerque, NM (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 1325 days.

(21) Appl. No.: 11/859,789

(22) Filed: Sep. 23, 2007

(65) Prior Publication Data
US 2009/0079828 A1  Mar. 26, 2009

(51) Int. Cl.
H04N 5/33 (2006.01)
B60Q 1/48 (2006.01)
G08G 1/017 (2006.01)
G08G 1/123 (2006.01)

(52) U.S. Cl. ............... 348/148; 340/932.2; 340/937; 340/995.17

(58) Field of Classification Search .......... 348/113–117, 348/148; 340/435, 901, 903, 932.2, 937, 340/995.17
See application file for complete search history.

(56) References Cited

U.S. PATENT DOCUMENTS

| | | | |
|---|---|---|---|
| 5,646,614 A * | 7/1997 | Abersfelder et al. ...... 340/932.2 |
| 5,670,935 A | 9/1997 | Schofield et al. | |
| 6,693,524 B1 | 2/2004 | Payne | |
| 6,819,231 B2 | 11/2004 | Berberich et al. | |
| 6,985,171 B1 | 1/2006 | Kuriya et al. | |
| 7,161,616 B1 | 1/2007 | Okamoto et al. | |
| 7,656,313 B2 * | 2/2010 | Victor et al. ............. 340/995.26 |
| 7,859,565 B2 * | 12/2010 | Schofield et al. ............. 348/148 |
| 2005/0073431 A1 | 4/2005 | Moisel et al. | |
| 2005/0128061 A1 * | 6/2005 | Yanai ............................ 340/435 |
| 2005/0203704 A1 | 9/2005 | Frank et al. | |
| 2006/0115124 A1 | 6/2006 | Nobori et al. | |
| 2007/0025714 A1 * | 2/2007 | Shiraki ........................... 396/72 |

(Continued)

FOREIGN PATENT DOCUMENTS
DE  19801884 A1  7/1999
(Continued)

OTHER PUBLICATIONS

Search Report issued by the German Patent Office for the counterpart German Patent Application No. DE 10 2008 039 136.0, dated Jun. 9, 2009.

*Primary Examiner* — Joseph Avellino
*Assistant Examiner* — Aftab Nasir Khan
(74) *Attorney, Agent, or Firm* — Manfred Beck, P.A.

(57) ABSTRACT

A camera system for a vehicle includes a camera unit mounted on the vehicle for viewing an area outside the vehicle. A image processing unit receives image data from the camera unit. A control unit receives vehicle operation data including vehicle speed data. A display unit is configured to transition between a screen image defined by a first viewing angle and a screen image defined by a second viewing angle. The first viewing angle and the second viewing angle extend substantially in a vertical plane, and the first viewing angle is greater than the second viewing angle. The display unit further displays supplemental information based on the vehicle operation data, the supplemental information includes vehicle speed information and information indicating a transition behavior of the display unit configured to transition between the first viewing angle and the second viewing angle. A method for controlling a camera system is also provided.

14 Claims, 4 Drawing Sheets

U.S. PATENT DOCUMENTS

| | | | |
|---|---|---|---|
| 2008/0007428 A1* | 1/2008 | Watanabe et al. | 340/901 |
| 2008/0195285 A1* | 8/2008 | Shimizu | 701/45 |
| 2008/0306636 A1* | 12/2008 | Caspe-Detzer et al. | 701/1 |
| 2009/0010567 A1* | 1/2009 | Akiba et al. | 382/298 |
| 2009/0059005 A1* | 3/2009 | Hattori et al. | 348/148 |
| 2009/0059006 A1* | 3/2009 | Hattori et al. | 348/148 |
| 2009/0066842 A1* | 3/2009 | Hattori et al. | 348/607 |

FOREIGN PATENT DOCUMENTS

| | | |
|---|---|---|
| DE | 102004012604 B4 | 10/2005 |
| DE | 102005051777 A1 | 6/2006 |
| DE | 10346511 B4 | 1/2008 |

* cited by examiner

CAMERA SYSTEM FOR A VEHICLE AND METHOD FOR CONTROLLING A CAMERA SYSTEM

BACKGROUND OF THE INVENTION

Field of the Invention

The invention relates to a camera system for a vehicle and a method for controlling a camera system of a vehicle. The invention relates in particular to a rear view camera system for a vehicle and a method for controlling a rear view camera system of a vehicle.

Automotive video cameras are widely used for automotive rear view and safety applications. Video cameras are for example used in order to assist a driver during a parking maneuver or when backing up the vehicle. In order to comply with legislative requirements, as well as to improve vehicle occupant and pedestrian safety, automotive camera systems must adapt to increase the driver's situational awareness.

Video cameras are used to reduce or eliminate the blind spot behind the vehicle. Generally, bigger vehicles such as trucks have bigger blind spots and therefore the probability of a so-called back over accident is higher for trucks and sports utility vehicles. As the number of trucks and sports utility vehicles has increased, back over accidents have become an increasing concern.

In the case of conventional rear view camera systems, a camera is mounted in the rear of the vehicle, and the corresponding video signal is displayed in the driver's field of view. The video signal is typically displayed on a display screen which serves dual-purpose as the radio and navigation unit.

Many rear view camera systems utilize a wide-angle lens to increase the viewable area behind the vehicle. An advantage of wide-angle lenses is that they create an increased peripheral vision. A disadvantage of such rear view camera systems having wide-angle lenses is that they introduce image distortion which makes it difficult to gauge depth and the distance to objects in the field of view.

Rear view video camera systems have become widely used as production vehicle sensors to aid in parking and obstacle avoidance. In addition, there are camera systems that perform an image processing in order to reduce image distortion and in order to generate an alternate viewpoint. Also, there are camera systems with a front-mounted camera which can display views looking to the left and right of the car. Furthermore, there are camera systems that utilize a top-down image viewpoint conversion in order to create a top-down image of the area around the vehicle.

U.S. Pat. No. 5,646,614 discloses a system for monitoring the rear or front space of a vehicle when the vehicle is being parked. The system has a video camera with an image sharpness control. The system can detect an object and can follow the object in terms of its sharpness by using the camera's autofocus over the whole search field. The system uses this property for an image-processing-supported tracking of the viewing angle of the video camera. The video camera is pivotable such that the video camera can tilt up or down and pivot sideways. A disadvantage of the system is that the camera's image angle does not cover 180 degrees and therefore the video camera has to be pivoted sideways in order to view the entire space behind the vehicle. Another disadvantage of the system is that the system requires a pivoting device in order to pivot the video camera. A disadvantage of such a pivoting device is that the mechanical components of the pivoting device require additional installation space and increase costs for the overall system.

U.S. Pat. No. 6,819,231 B2 discloses a parking and maneuvering assistance system for a vehicle. The system includes a video camera and a graphic display unit with which the image information recorded by the video camera can be displayed in the interior of the vehicle. The video camera is situated behind a protective element such that the video camera is essentially inaccessible from the outside when the video camera is in a resting position. The protective element has an opening which is covered by a cover when the video camera is not activated. When the camera is activated, the cover pivots away from the opening in the protective element and allows the lens system of the video camera to protrude through the opening in the protective element. The system further includes a drive mechanism with a motor which acts on a toothed rack via a gear for moving the video camera forwards and backwards. A disadvantage of this parking and maneuvering assistance system is that the drive mechanism is mechanically complex and requires a substantial amount of installation space.

U.S. Pat. No. 6,693,524 B1 discloses a vehicle backup monitoring and alarm system for large commercial trucks. The system includes three closed circuit video cameras, three laser-based distance detection systems and a monitor. A camera and a laser-based distance detection system are mounted on each side, as well as the rear of the truck, and are coupled to the monitor which displays all three images simultaneously. The distance to the closest object, displayed by each camera, as determined by the laser-based distance detection system, is superimposed over the respective object in the monitor. If a distance to an object falls below a minimum distance, the numeric representation of the distance will flash and an audible alarm will sound. A disadvantage of this system is that it requires a considerable outlay for the hardware that is necessary to implement the system.

U.S. Pat. No. 5,670,935 discloses a rear view vision system for a vehicle that includes at least two video cameras directed rearwardly with respect to the direction of travel of the vehicle. A display system displays an image synthesized from the output of the video cameras. The system is intended to replace traditional rear view mirrors. In other words, the system is intended to make the driver aware of other vehicles while driving. The rear view vision system disclosed in U.S. Pat. No. 5,670,935 is not suitable as a backup monitoring system because the video cameras are set up such that there are blind zones behind the vehicle.

German Patent Application Publication No. DE 10 2005 051 777 A1 discloses a view support system for parking a vehicle. The system includes a camera at the rear of the vehicle, a camera on the driver's side of the vehicle and a camera on the passenger's side of the vehicle. The system processes the images provided by the cameras and generates a bird's eye view of the area surrounding the vehicle. The display of the bird's eye view is used to assist the driver during parking maneuvers. A disadvantage of this system is the outlay required for the hardware because three separate cameras must be installed on the vehicle.

U.S. Pat. No. 6,985,171 B1 discloses an image transformation apparatus for a vehicle rear monitoring device. The image transformation apparatus uses a transformation table to transform an image of the rear of a vehicle captured by a camera mounted on the vehicle for capturing the rear of the vehicle into an output image assumed to be obtained by capturing the rear at a predetermined inclination from a virtual camera position different from an actual camera position at which the camera is mounted. The output image is displayed on a monitor. A steering start guideline, a steering amount guide mark, a vehicle width guideline, and a vehicle path guideline can be superimposed on the output image.

U.S. Pat. No. 7,161,616 B1 describes an image processing device for generating a synthetic image that has a virtual point of view above a vehicle. The synthetic image is generated through the use of images captured by a plurality of cameras mounted on the vehicle. In the synthetic image, an illustration image or an actual image of the vehicle is displayed in a vehicle region in which the vehicle is present. The area around the vehicle that is not shot by any of the cameras is displayed as a blind spot region. U.S. Patent Application Publication No. 2006/0115124 A1 discloses another system for monitoring the surroundings of a vehicle. An image synthesis section reads out camera images from frame memories according to a selected image synthesis parameter and generates a synthesized image showing a state of vehicle surroundings. A disadvantage of these systems is that they require a considerable expenditure in terms of hardware because a number of cameras are necessary to capture the images.

SUMMARY OF THE INVENTION

It is accordingly an object of the invention to provide a camera system for a vehicle and a method for controlling a camera system for a vehicle which overcome the above-mentioned disadvantages of the heretofore-known systems and methods of this general type and which can be implemented in a cost-effective manner. Another object of the invention is to provide a rear view camera system which reduces problems resulting from the image distortion of wide-angle lenses and which correspondingly improves the driver's ability to gauge depth and distance to objects in the field of view.

With the foregoing and other objects in view there is provided, in accordance with the invention, a camera system including:

a camera unit mounted on the vehicle for viewing an area outside the vehicle;

an image processing unit operatively connected to the camera unit for receiving image data from the camera unit;

a display unit operatively connected to the image processing unit;

a control unit operatively connected to the display unit, the control unit receiving vehicle operation data including vehicle speed data;

the display unit displaying a screen image generated from the image data provided by the camera unit, the display unit being configured to transition between a screen image defined by a first viewing angle and a screen image defined by a second viewing angle, the first viewing angle and the second viewing angle extending substantially in a vertical plane, and the first viewing angle being greater than the second viewing angle; and the display unit further displaying, concurrently with the screen image generated from the image data, supplemental information based on the vehicle operation data, the supplemental information including vehicle speed information and information indicating a transition behavior of the display unit configured to transition between a screen image defined by the first viewing angle and a screen image defined by the second viewing angle.

An advantage of the above-defined camera system is that it allows a driver to utilize the camera system for a wide-angle peripheral view (first viewing angle), which provides an improved overview at higher speeds and for a view having a reduced viewing angle (second viewing angle) at lower speeds in order to increase depth perspective during parking maneuvers.

In accordance with another feature of the invention, the control unit controls the display unit as a function of the vehicle speed data such that the display unit transitions from a screen image defined by the first viewing angle (wide-angle view) to a screen image defined by the second viewing angle if a vehicle speed falls below a threshold value. This feature allows the driver to look further ahead when driving at higher speeds and provides a close-up view of the area directly behind the vehicle when driving at lower speeds.

In accordance with the further feature of the invention, the control unit controls the display unit as a function of the vehicle speed data such that the display unit transitions from a screen image defined by the second viewing angle (top angle view) to a screen image defined by the first viewing angle if a vehicle speed rises above a threshold value. The camera viewing angle thus adapts automatically to the viewing behavior of a driver who looks further ahead as the vehicle speed increases.

According to another feature of the invention, the display unit is configured to perform a smooth transition between a screen image defined by the first viewing angle and a screen image defined by the second viewing angle with a transition duration between 0.5 seconds and 2 seconds, and preferably with a duration of about 1 second. A smooth transition allows the driver to follow the camera movement and prevents the driver from becoming disoriented.

In accordance with another feature of the invention, the camera unit is a rear view camera unit with a wide-angle lens for viewing an area behind the vehicle; and the image processing unit is configured to process the image data in order to reduce image distortion.

According to yet another feature of the invention, the control unit controls the display unit in dependence on the vehicle speed data and steering angle data. The camera unit can for example be embodied as a left/right steerable rear view camera, which turns the camera viewing angle along with steering information to increase perspective based on a vehicle direction.

In accordance with a further feature of the invention, the display unit displays a slider bar for presenting the vehicle speed information.

According to another feature of the invention, the display unit displays a slider bar for presenting the vehicle speed information; and the display unit selectively displays a first label and a second label for indicating when the display unit will transition between a screen image defined by the first viewing angle (wide-angle view for a large target viewing angle α) and a screen image defined by the second viewing angle (top angle view for a smaller target viewing angle α). The first and second label may for example be a descriptive label or a pictogram.

In accordance with yet another feature of the invention, the display unit further displays, concurrently with a screen image generated from the image data, a steering angle overlay having trajectory lines.

According to a further feature of the invention, the display unit further displays, concurrently with a screen image generated from the image data, a steering angle overlay having trajectory lines for providing steering angle information and the steering angle overlay having transverse lines for providing distance information, the trajectory lines and the transverse lines intersecting at an angle of substantially 90 degrees when the vehicle is traveling in a straight line.

According to another feature of the invention, the camera unit is a video camera mounted stationary with respect to the vehicle; and the image processing unit processes the image data from the camera unit in order to selectively create a screen image defined by the first viewing angle and a screen image defined by the second viewing angle.

An advantage of the above-defined camera system is that it allows for a rear view camera to utilize image distortion techniques to allow the driver an enhanced perspective during specific driving situations. The camera system is capable of changing the viewing angle and perspective based on vehicle speed, steering information, external sensors, or other information in real time. This allows the driver to utilize the camera system for a wide peripheral view in some situations, while adapting the camera to increase depth perspective in other driving situations.

With the objects of the invention in view there is also provided, a method for controlling a camera system with the following steps:

using a camera unit mounted on a vehicle and pointed at an area outside the vehicle for capturing image data;

displaying, with a display unit, a screen image generated from the image data provided by the camera unit such that the display unit selectively provides a screen image defined by a first viewing angle and a screen image defined by a second viewing angle, the first viewing angle and the second viewing angle extending substantially in a vertical plane, and the first viewing angle being greater than the second viewing angle; and displaying, concurrently with the screen image generated from the image data, supplemental information including vehicle speed information and information indicating a transition behavior of the display unit configured to transition between a screen image defined by the first viewing angle and a screen image defined by the second viewing angle.

Another mode of the method according to the invention includes transitioning from a screen image defined by the first viewing angle to a screen image defined by the second viewing angle if a vehicle speed falls below a threshold value.

A further mode of the method according to the invention includes transitioning from a screen image defined by the second viewing angle to a screen image defined by the first viewing angle if a vehicle speed rises above a threshold value.

Another mode of the method according to the invention includes performing a smooth transition between a screen image defined by the first viewing angle and a screen image defined by the second viewing angle with a transition duration between 0.5 seconds and 2 seconds.

Another mode of the method according to the invention includes using, as the camera unit, a rear view camera unit with a wide-angle lens for viewing an area behind the vehicle; and reducing an image distortion at least for the image defined by the second viewing angle by processing the image data provided by the camera unit.

Another mode of the method according to the invention includes controlling the display unit in dependence on the vehicle speed data and steering angle data.

Another mode of the method according to the invention includes displaying the vehicle speed information with a slider bar; and displaying selectively a first label and a second label indicating when the display unit will transition between a screen image defined by the first viewing angle and a screen image defined by the second viewing angle.

A further mode of the method according to the invention includes displaying, concurrently with the screen image generated from the image data, a steering angle overlay having trajectory lines.

Another mode of the method according to the invention includes displaying, concurrently with the screen image generated from the image data, a steering angle overlay having trajectory lines for providing steering angle information and the steering angle overlay having transverse lines for providing distance information, the trajectory lines and the transverse lines intersecting at an angle of substantially 90 degrees when the vehicle is traveling in a straight line.

The invention utilizes a camera system to display the rear-facing video feed to the driver, applies an overlay which describes the behavior of the camera and the vehicle behavior and provides relative steering angle information to the driver for various camera angles.

The viewing angle or viewpoint of the camera is dependent on vehicle operation date (vehicle state information). A slider bar overlay placed on the screen image allows the driver to intuitively control the viewing angle, to increase the driver's awareness of the situation and allows the driver to more quickly recognize the state of the camera and objects in the field of view which require the driver's attention.

Advantages of the above-defined dynamic rear view camera system are its versatility in display options for a single rigid-mounted camera, added flexibility in camera mounting through software modification of viewing angle, on board digital signal processing to allow quick product changes and upgrades, and an improved display of speed information and camera transitions to the driver. These advantages are achieved by dynamically changing a video output through digital signal processing, by the specific control of the camera viewing angle and by reducing distortion, while applying an overlay system which describes camera state transitions to the driver in a clear and concise manner.

Other features which are considered as characteristic for the invention are set forth in the appended claims.

Although the invention is illustrated and described herein as embodied in a rear view camera system for a vehicle and a method for controlling a rear view camera system of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
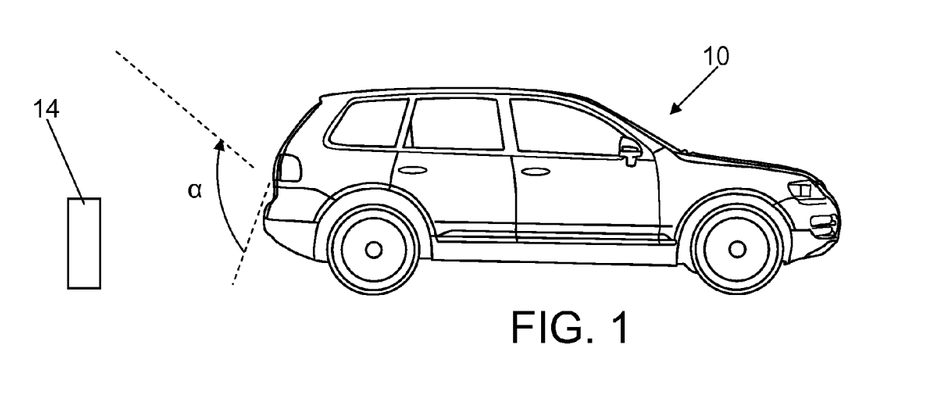
FIG. 1 is a diagrammatic side view of a vehicle for illustrating a target viewing angle for a wide-angle view of a rear view camera system according to the invention.

Referring now to the figures of the drawings in detail and first, particularly, to FIG. 1 thereof, there is shown a diagrammatic side view of a vehicle 10 for illustrating a target viewing angle α for a wide-angle view of a rear view camera system according to the invention. The target viewing angle α extends in a vertical plane. An obstacle 14 is positioned behind the vehicle 10 within the target viewing angle α. The vehicle 10 has a rear view camera unit 12 mounted at the rear of the vehicle 10. The rear view camera unit 12 has a wide-angle lens 44 in order to provide a field of view of about 180 degrees.

The rear view camera system operates as a dynamic rear view camera system as described below. An exemplary embodiment of the rear view camera unit 12 utilizes a 1.3 mega-pixel imager with a 188 degree field of view wide-angle lens. Such an imager with a wide-angle lens is for example part of a camera module that has a built-in digital signal processor which is capable of delivering custom views, distortions, and settings.

Figure 3:
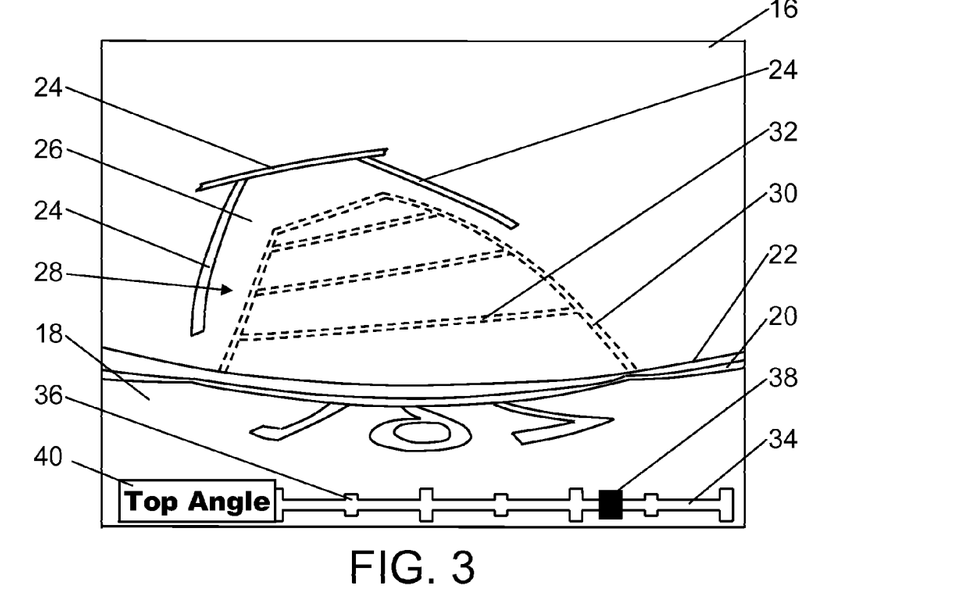
FIGS. 3 and 4 are diagrammatic video displays of a rear view camera system according to the invention illustrating a wide-angle view.
Figure 4:
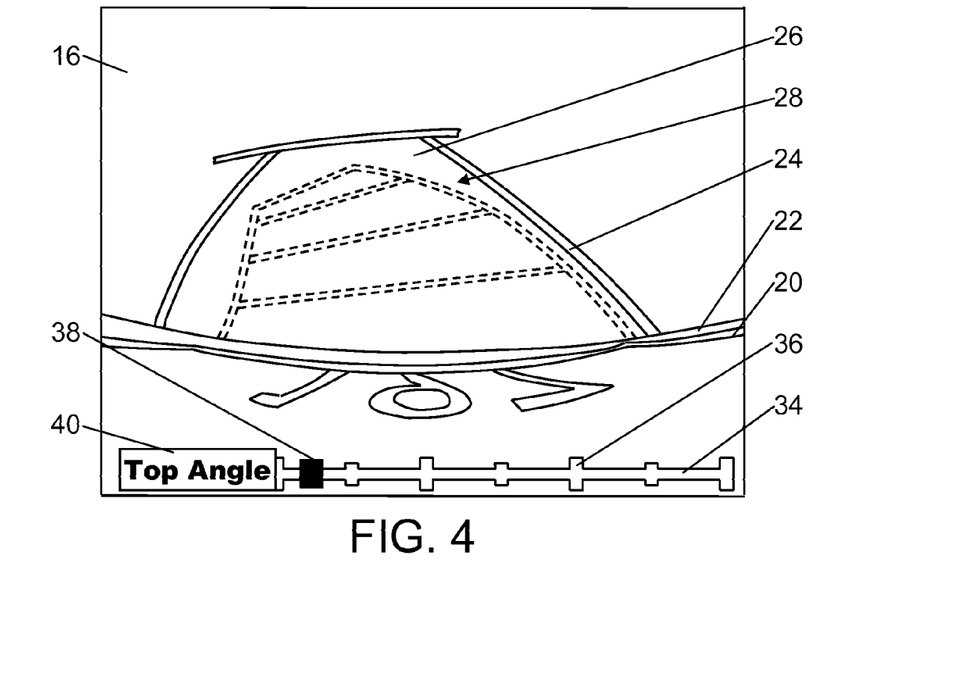

For a wide-angle view, the rear view camera system may utilize the full field of view of the rear view camera unit 12 of for example 188 degrees. The rear view camera unit 12 is preferably pointed downwards at approximately 45 degrees from horizontal. The output of the rear view camera unit 12 is advantageously stretched such that the amount of the vehicle 10 appearing in the frame is reduced. FIGS. 3 and 4 show wide-angle views with the rear view camera unit 12.

Figure 2:
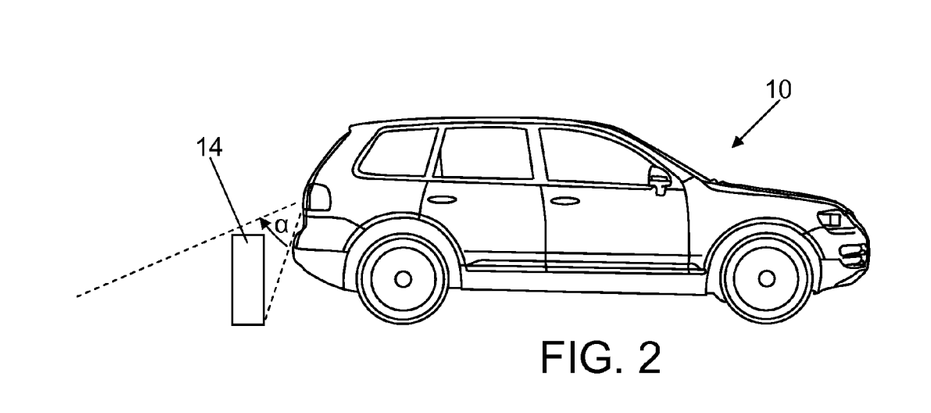
FIG. 2 is a diagrammatic side view of a vehicle for illustrating a target viewing angle for a near-field view of the rear view camera system according to the invention.

FIG. 2 is a diagrammatic side view of the vehicle 10 for illustrating a target viewing angle α for a near-field view of the rear view camera system according to the invention. In FIG. 2, the vehicle 10 has backed up against the obstacle 14 such that the obstacle 14 is positioned close to the rear bumper of the vehicle 10. The obstacle 14 is within the target viewing angle α, wherein the target viewing angle α for the near-field view illustrated in FIG. 2 is smaller than the target viewing angle α for the wide-angle view illustrated in FIG. 1.

The target viewing angle α for the wide-angle view is a primary viewing angle that provides a wide-angle view of the area behind the vehicle 10. Such a wide-angle view is generally provided by conventional backup cameras in order to show as much as possible of the area behind the vehicle. The wide-angle view results in an image distortion which makes it difficult to gauge the distance between the vehicle 10 and the obstacle 14 located behind the vehicle 10. In addition to the primary viewing angle (first viewing angle), a secondary viewing angle (second viewing angle) is provided to focus on objects directly behind the vehicle 10, such as the obstacle 14 shown in FIG. 2, and to enhance perspective when viewing nearby objects. The secondary viewing angle is created by adjusting the rotational angle of the camera to approximately 70 degrees from horizontal, and introducing image distortion to remove the "fish eye" warping resulting from the wide-angle lens that the camera uses. The secondary viewing angle is for example optimized to focus on objects within approximately 3 meters of the vehicle 10.

Figure 5:
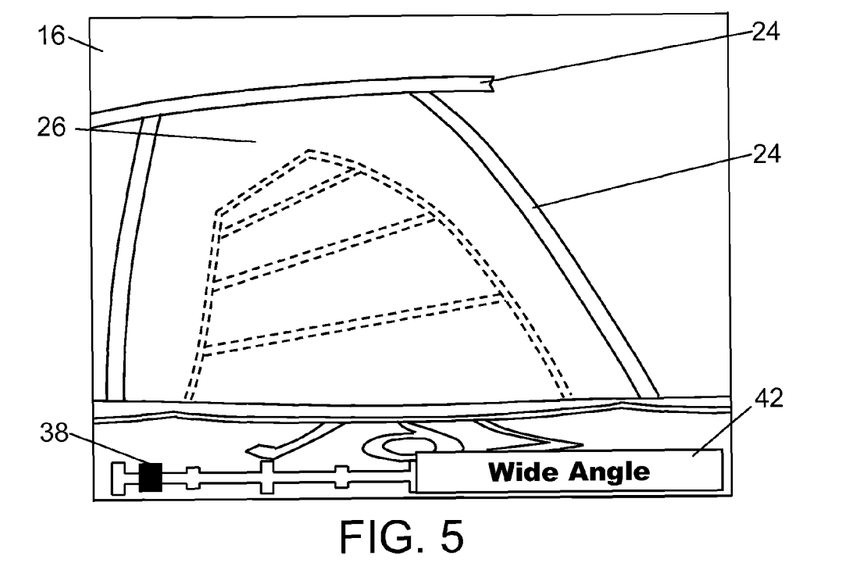
FIGS. 5 and 6 are diagrammatic video displays of a rear view camera system according to the invention illustrating a top angle view.
Figure 6:
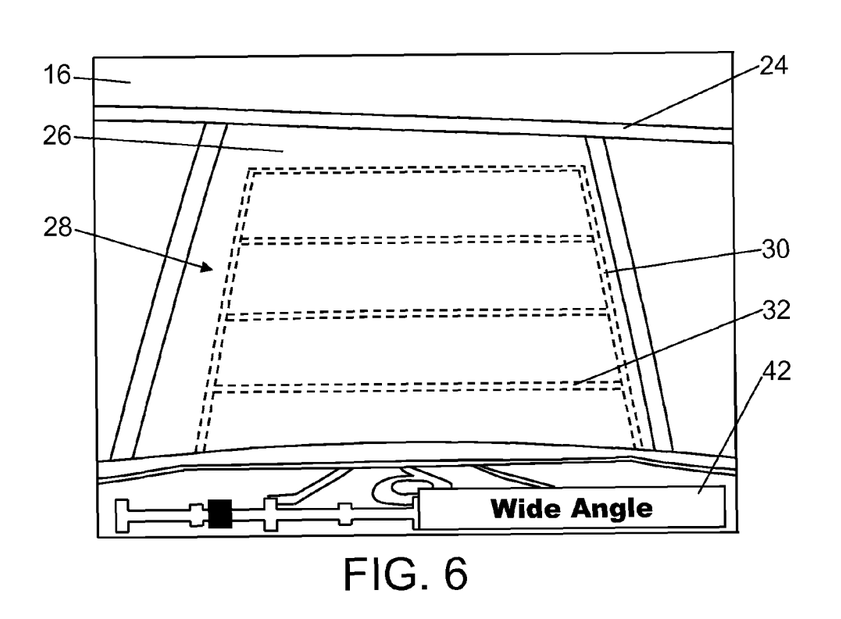

The camera system can be controlled in the following manner. In accordance with an embodiment of the rear view camera system, the transitioning or switching between the primary viewing angle and the secondary viewing angle is controlled such that the rear view camera system switches to a wide-angle view when traveling at speeds above 2 kilometers per hour (km/h) as show in FIGS. 3 and 4. When driving at a speed below 1 km/h, the camera system switches to the near-field view (top angle view), as shown in FIGS. 5 and 6.

When switching between angles, the camera system preferably uses a control method that allows a smooth transition between the two views. The rising time and the falling time of the camera is a linear transition between the two angles with a duration of approximately 1 second.

In accordance with an alternative method for transitioning between viewing angles, the transitioning is linearly based on speed, such that at 0 km/h, the camera faces downwards, and at 3 km/h the camera provides a full wide-angle view. In contrast to the method of transitioning at fixed speeds, the method of transitioning linearly with the speed controls the camera such that at intermediate speeds, the camera displays a view which is a corresponding percentage between the wide-angle and downward facing angle. The smoothness of the video output using the speed-linear control method is dependent on the smoothness of the driver's acceleration and deceleration at low speeds. The speeds and transition times chosen for either mode can be chosen in an arbitrary manner, however, the above-described exemplary speeds and transition times were found to be useful for normal driving conditions.

FIG. 3 is a diagrammatic video display 16 of the rear view camera system according to the invention illustrating a wide-angle view of the camera unit 12. In this exemplary case, the camera unit 12 is mounted above the license plate 18 on the tailgate of the vehicle 10. The license plate 18 is displayed in the lower portion of the display 16. The license plate 18 is bounded by a license plate frame 20. The outer edge of the rear bumper 22 of the vehicle 10 can be seen as a curved line in the display 16. Pavement markings 24 in the form of white lines mark the boundaries of a parking space 26. Due to the wide-angle view of the camera unit 12, the screen image of the display 16 is distorted. As a result of the distortion, the outlines of the license plate 18, the rear bumper 22, and the pavement markings 24 are curved lines. The display 16 further shows a steering angle overlay 28 which is indicated by dashed lines.

The steering angle overlay 28 provides steering angle information by displaying the vehicle's trajectory on the display 16 given a fixed steering angle. In other words, if the driver were to keep the steering wheel fixed at this steering angle, then the vehicle 10 would back up along the trajectory lines 30. The steering angle overlay 28 changes dynamically with the steering angle of the steering wheel. Even if the vehicle is stationary, the steering angle overlay 28 would therefore change as the driver turns the steering wheel. The transverse lines 32 of the steering angle overlay 28 assist the driver in assessing distances.

At the bottom of the display 16 is a slider bar 34 for indicating the vehicle speed. The slider bar 34 has markings 36 along the slider bar 34. In the exemplary embodiment shown in FIGS. 3 to 6, the slider bar 34 is configured to indicate speeds between 0 and 4 kilometers per hour. The speed indicator slider 38 moves along the slider bar 34 in order to show the current vehicle speed. In the display 16 shown in FIG. 3, the indicated vehicle speed is approximately 3.2 km/h. In the lower left corner of the display 16 shown in FIG. 3 is a rectangular label 40 that covers a portion of the slider bar 34. The label 40 indicates that the camera switches to a top angle view at low speeds. In other words, if the speed indicator slider 38 in FIGS. 3 and 4 moves along the slider bar 34 so far left that it touches the label 40, then the camera will switch to the top angle view. Conversely, if the speed indicator slider 38 in FIGS. 5 and 6 moves along the slider bar 34 to the right (higher speeds) such that the speed slider indicator 38 touches the label 42, then the camera will switch to a wide-angle view.

FIG. 4 is a diagrammatic video display 16 illustrating a wide-angle view of the camera unit 12 after the vehicle 10 has further backed up towards the parking space 26 when compared to FIG. 3. The steering angle overlay 28 shown in FIG. 4 illustrates that the steering wheel is in a turned position. The steering angle overlay 28 displays the vehicle's trajectory if the current steering angle were to remain fixed. In other words, if the driver were to keep the steering wheel at the current steering angle, then the vehicle 10 would back up along the trajectory lines 30. The steering angle overlay 28 shown in FIG. 4 indicates to the driver that the driver has to turn the steering wheel in the opposite direction in order to properly back into the parking space 26. When compared to FIG. 3, the speed indicator slider 38 in FIG. 4 has moved to the left (lower speeds) indicating that the vehicle 10 has slowed down. The speed indicator slider 38 in FIG. 4 is positioned directly to the right of the label 40. This means that if the vehicle slows down even further, then the camera system will switch to a top angle view.

FIG. 5 is a diagrammatic video display 16 of the rear view camera system illustrating a downward-facing top angle view (near-field view) of the camera unit 12. In FIG. 5, the speed indicator slider 38 is close to the left end of the slider bar 34 which indicates that the vehicle 10 moves at a speed of less than 0.5 km/h. The label 42 on the right side of the slider bar 34 indicates the speed range where the rear view camera system switches to the wide-angle view. As can be seen in FIGS. 5 and 6, the image provided in the top angle view has less distortion than the image provided in the wide-angle view. As a result, it is easier for the driver to gauge depth and estimate a distance between the vehicle and an obstacle. Thus it is easier for the driver to perform parking maneuvers at low speeds such as backing up the vehicle into the parking space 26 and keeping the vehicle 10 within the pavement markings 24 that delimit the parking space 26. Furthermore, the top angle view (near-field view) provides a target viewing angle α that allows the driver to view the area directly behind the vehicle 10 as is illustrated in FIG. 2. The top angle view therefore improves the visual detection of obstacles directly behind the vehicle 10.

FIG. 6 is a further diagrammatic display 16 of the rear view camera system illustrating a top angle view of the camera unit 12. In FIG. 6, the steering angle overlay 28 indicates that the steering angle is essentially zero such that the vehicle 10 is driving in a straight line in order to back up into the parking space 26. The transverse lines 32 of the steering angle overlay 28 help the driver to stop the vehicle directly in front of the pavement marking 24 that indicates the end of the parking space 26. The transverse line 32 of the steering angle overlay 28 that is closest to the vehicle 10 is preferably displayed in a color that is different from the other lines of the steering angle overlay 28 in order to indicate that the driver has to stop the vehicle 10 when this transverse line 32 coincides with the pavement marking 24 indicating the end of the parking space 26.

As described above, the video display 16 has a multiple viewing angle support (wide-angle view, top angle view) with a steering angle overlay 28. In accordance with an embodiment of the invention, the rear view camera system uses vehicle state information from the CAN (Controller Area network) network and camera control information in order to apply an overlay which includes steering information in the form of a steering angle overlay, vehicle speed information in the form of a slider bar, and information about when the camera will transition. As shown in FIGS. 3 to 6, the steering angle information is presented by using a projection to show the vehicle's trajectory on the video display given a fixed steering angle. In accordance with an embodiment of the invention, the rear view camera system provides added functionality for the dynamic camera system in that the projected overlay geometry is adapted to different camera angles and distortions.

The significance of displaying the vehicle speed and the significance of the camera view transitions displayed to the driver is explained in more detail in the following. In order to inform the driver of the current state of the camera and in order to provide vehicle speed information to the driver, a slider bar 34 is shown on the bottom of the display 16. The area on the bottom of the display 16 is advantageous because it occludes only the license plate 18 on the tailgate of the vehicle 10 in the video image (screen image), rather than any possible objects in the camera's field of view. While driving, the speed indicator slider 38 tracks the vehicle speed. The magnitude of the vehicle speed is shown with tick marks 36 at every 0.5 km/h increment. The vehicle speeds which cause a transition in the camera are shown by displaying a graphic, such as the descriptive labels 40, 42 at the corresponding speed. When the vehicle transitions above or below these speed limits, the camera transitions its viewing angle and the overlay switches to the corresponding geometry to assist steering information.

Displaying the camera transition information on the rear view video feed is an important feature for the operation of the rear view camera system according to the invention. By displaying the state transitions of the camera, the driver is allowed a greater feeling of control and the operation of the system is simplified. Without this information, i.e. without knowing the camera's current state and what events cause the camera to transition, the camera could be confusing. The camera transitions could alternately be caused by sensor data, extreme steering angles, user input, speed, or a combination of these inputs. This combination of inputs could be used to display warning icons or alternate graphics on the video feed to indicate camera transitions.

Applications for the above-described camera system for a dynamic rear view interface include parking assist and pedestrian/object avoidance systems, rear view mirror assistance systems, in-car display of video output for entertainment or safety purposes to front-seat passengers or rear-seat passengers, forward or rearward looking cameras controlled with ultrasonic or proximity sensor signals for providing a top-down, magnified, or altered view when obstacles are sensed.

The use of the camera system according to the invention can be extended to include a hard-drive or digital media storage for storing a video output for the purpose of downloading the video output to a personal computer or sharing the video output online. The camera unit can furthermore be embodied as a left/right steerable rear view camera, which would turn the camera viewing angle along with steering information to increase perspective based on a vehicle direction. In addition, a top down image conversion could be performed for displaying a bird's eye view. The camera system can also be modified for safety applications such as side lane assist, blind spot warning, or heading control.

Figure 7:
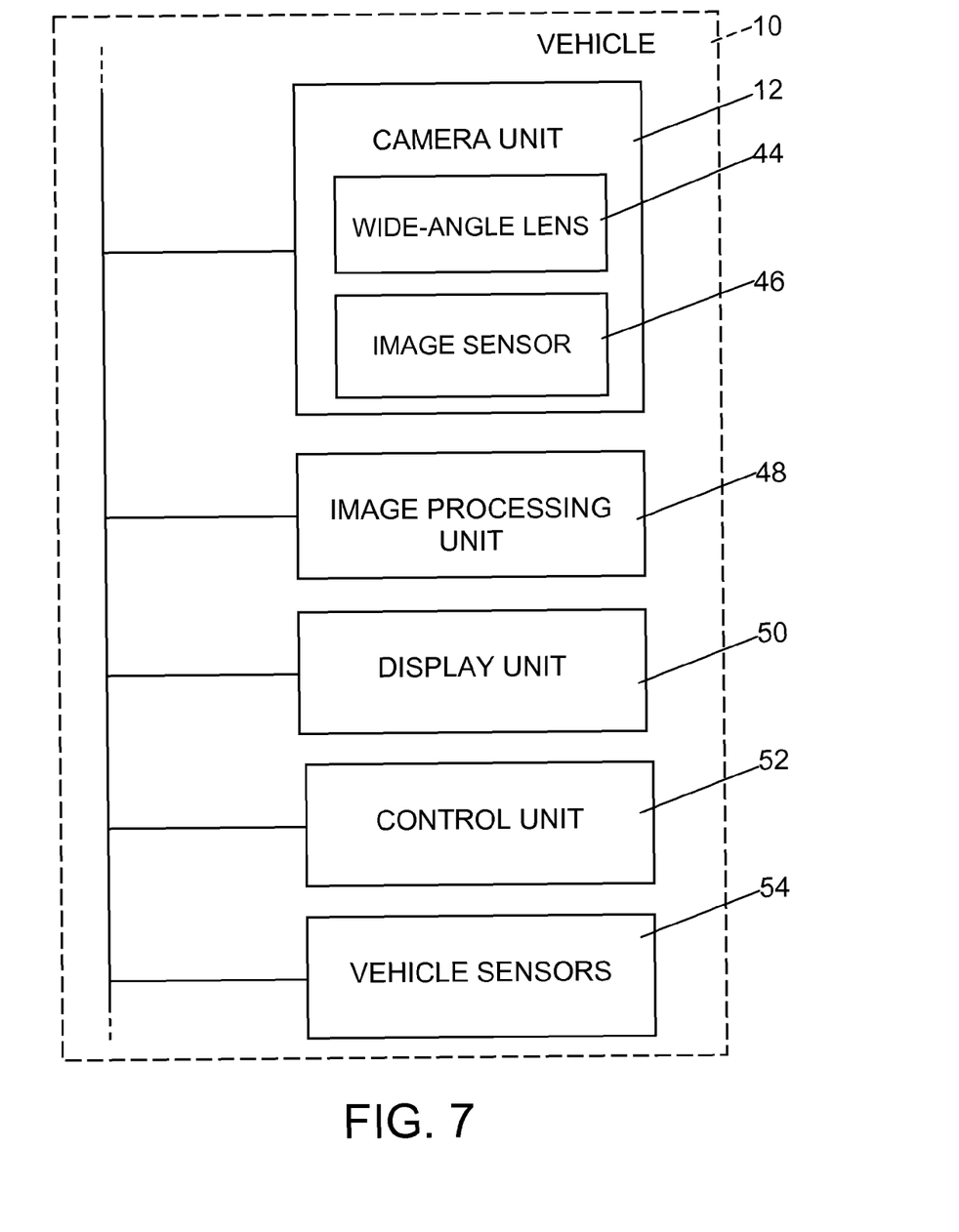
FIG. 7 is a block diagram illustrating components of a vehicle equipped with a camera system according to the invention.

FIG. 7 is a block diagram illustrating components of a vehicle 10 equipped with a camera system according to the invention. The vehicle 10 is only schematically indicated by a dashed line. A camera unit 12 includes a wide-angle lens 44 and an image sensor 46. The image sensor 46 may be embodied in a conventional manner such as a CCD (charge-coupled device) image sensor or a CMOS (complementary metal oxide semiconductor) images sensor. The image sensor 46 converts the image captured by the wide-angle lens 44 into electrical signals which are supplied to the image processing unit 48. The camera unit 12 is set up such that the wide-angle lens 44 can capture a field of view of approximately 180 degrees. The image processing reduces for example image distortion caused by the wide-angle lens 44. A real-time image or video distortion processing can be achieved using FPGA (field programmable gate array) or DSP (digital signal processor) technology.

A display unit 50 displays the screen image generated from the image data provided by the camera unit 12. Vehicle sensors 54 provide vehicle operation data such as a vehicle speed, a steering angle, and a selected gear. The vehicle operation data are provided to the control unit 52 which uses the vehicle operation data in order to control the display unit 50. As described above, the display unit 50 is controlled such that it transitions between a wide-angle view at higher vehicle speeds and a top angle view or near-field view at lower vehicle speeds. The control unit 52 furthermore controls the display unit 50 such that the vehicle speed and the transition behavior of the display unit 50 are provided on the video display 16.

What is claimed is:

1. In combination with a vehicle, a camera system comprising:
    a camera unit mounted on the vehicle for viewing an area outside the vehicle;
    an image processing unit operatively connected to said camera unit for receiving image data from said camera unit;
    a display unit operatively connected to said image processing unit;
    a control unit operatively connected to said display unit, said control unit receiving vehicle operation data including vehicle speed data;
    said display unit displaying a screen image generated from the image data provided by said camera unit, said display unit transitioning between a screen image defined by a first viewing angle and a screen image defined by a second viewing angle, the first viewing angle and the second viewing angle extending substantially in a vertical plane, and the first viewing angle being greater than the second viewing angle;
    said display unit further displaying, concurrently with the screen image generated from the image data, supplemental information based on the vehicle operation data, the supplemental information including vehicle speed information indicative of a vehicle speed of the vehicle and information indicating a transition behavior of said display unit transitioning between a screen image defined by the first viewing angle and a screen image defined by the second viewing angle, wherein said display unit performs a smooth transition between a screen image defined by the first viewing angle and a screen image defined by the second viewing angle with a transition duration between 0.5 seconds and 2 seconds; and
    said control unit controlling said display unit as a function of the vehicle speed data such that said display unit transitions from a screen image defined by the first viewing angle to a screen image defined by the second viewing angle when the vehicle speed falls below a threshold value, wherein said control unit controls said display unit as a function of the vehicle speed data such that said display unit transitions from a screen image defined by the second viewing angle to a screen image defined by the first viewing angle when the vehicle speed rises above a threshold value.

2. The camera system according to claim 1, wherein:
    said camera unit is a rear view camera unit with a wide-angle lens for viewing an area behind the vehicle; and
    said image processing unit processes the image data in order to reduce image distortion.

3. The camera system according to claim 1, wherein said control unit controls said display unit in dependence on the vehicle speed data and steering angle data.

4. The camera system according to claim 1, wherein said display unit displays a slider bar for presenting the vehicle speed information.

5. The camera system according to claim 1, wherein:
    said display unit displays a slider bar for presenting the vehicle speed information; and
    said display unit selectively displays a first label and a second label for indicating when said display unit will transition between a screen image defined by the first viewing angle and a screen image defined by the second viewing angle.

6. The camera system according to claim 1, wherein said display unit further displays, concurrently with a screen image generated from the image data, a steering angle overlay having trajectory lines.

7. The camera system according to claim 1, wherein said display unit further displays, concurrently with a screen image generated from the image data, a steering angle overlay having trajectory lines for providing steering angle information and said steering angle overlay having transverse lines for providing distance information, the trajectory lines and the transverse lines intersecting at an angle of substantially 90 degrees when the vehicle is traveling in a straight line.

8. The camera system according to claim 1, wherein:
    said camera unit is a video camera mounted stationary with respect to the vehicle; and
    said image processing unit processes the image data from said camera unit in order to selectively create a screen image defined by the first viewing angle and a screen image defined by the second viewing angle.

9. A method for controlling a camera system, the method which comprises:
    using a camera unit mounted on a vehicle and pointed at an area outside the vehicle for capturing image data;
    displaying, with a display unit, a screen image generated from the image data provided by the camera unit such that the display unit selectively provides a screen image defined by a first viewing angle and a screen image defined by a second viewing angle, the first viewing angle and the second viewing angle extending substantially in a vertical plane, and the first viewing angle being greater than the second viewing angle;
    displaying, concurrently with the screen image generated from the image data, supplemental information including at least one of vehicle speed information indicative of a vehicle speed of the vehicle and information indicating a transition behavior of the display unit, which selectively provides a screen image defined by the first viewing angle and a screen image defined by the second viewing angle; and performing a smooth transition between a screen image defined by the first viewing angle and a screen image defined by the second viewing angle with a transition duration between 0.5 seconds and 2 seconds, wherein the display unit transitions from a screen image defined by the first viewing angle to a screen image defined by the second viewing angle when the vehicle speed falls below a threshold value and transitions from a screen image defined by the second viewing angle to a screen image defined by the first viewing angle when the vehicle speed rises above a threshold value.

10. The method according to claim 9, which comprises:
using, as the camera unit, a rear view camera unit with a wide-angle lens for viewing an area behind the vehicle; and
reducing an image distortion at least for the image defined by the second viewing angle by processing the image data provided by the camera unit.

11. The method according to claim 9, which comprises controlling the display unit in dependence on the vehicle speed data and steering angle data.

12. The method according to claim 9, which comprises:
displaying the vehicle speed information with a slider bar; and
displaying selectively a first label and a second label indicating when the display unit will transition between a screen image defined by the first viewing angle and a screen image defined by the second viewing angle.

13. The method according to claim 9, which comprises displaying, concurrently with the screen image generated from the image data, a steering angle overlay having trajectory lines.

14. The method according to claim 9, which comprises displaying, concurrently with the screen image generated from the image data, a steering angle overlay having trajectory lines for providing steering angle information and the steering angle overlay having transverse lines for providing distance information, the trajectory lines and the transverse lines intersecting at an angle of substantially 90 degrees when the vehicle is traveling in a straight line.

* * * * *